United States Patent
Lachwani et al.

(10) Patent No.: US 10,855,789 B1
(45) Date of Patent: Dec. 1, 2020

(54) SYSTEM FOR MANAGEMENT OF AN ARRAY OF PROXY ACCESS DEVICES

(71) Applicant: HEADSPIN, INC., Mountain View, CA (US)

(72) Inventors: Manish Lachwani, Los Altos, CA (US); Marius Nita, San Francisco, CA (US); Brien Colwell, Oakland, CA (US)

(73) Assignee: HEADSPIN, INC., Mountain View, CA (US)

( * ) Notice: Subject to any disclaimer, the term of this patent is extended or adjusted under 35 U.S.C. 154(b) by 437 days.

(21) Appl. No.: 15/425,652

(22) Filed: Feb. 6, 2017

Related U.S. Application Data

(60) Provisional application No. 62/303,337, filed on Mar. 3, 2016.

(51) Int. Cl.
  *G06F 15/17* (2006.01)
  *H04L 29/08* (2006.01)
  *H04L 12/46* (2006.01)

(52) U.S. Cl.
  CPC .......... *H04L 67/28* (2013.01); *H04L 12/4641* (2013.01); *H04L 67/141* (2013.01); *H04L 67/30* (2013.01); *H04L 67/12* (2013.01)

(58) Field of Classification Search
  CPC ... H04L 29/08072; H04L 29/06; H04L 67/12; H04L 41/22
  See application file for complete search history.

(56) References Cited

U.S. PATENT DOCUMENTS

| | | | | |
|---|---|---|---|---|
| 8,544,066 B2 * | 9/2013 | Hatakeyama | ........... | G06F 21/33 705/51 |
| 8,613,044 B2 * | 12/2013 | Casey | ..................... | H04L 63/10 380/201 |
| 9,059,995 B2 * | 6/2015 | Casey | ..................... | H04L 63/10 |
| 9,681,318 B1 * | 6/2017 | Lachwani | ............. | H04W 24/06 |
| 10,257,159 B2 * | 4/2019 | Kim | ......................... | H04L 43/08 |
| 10,666,523 B2 * | 5/2020 | Dawes | ..................... | H04L 41/22 |
| 2005/0240943 A1 * | 10/2005 | Smith | ..................... | G06F 9/465 719/328 |
| 2005/0246716 A1 * | 11/2005 | Smith | ..................... | G06F 9/541 719/315 |
| 2011/0151864 A1 * | 6/2011 | Byun | ..................... | H04W 36/30 455/426.1 |
| 2014/0113625 A1 * | 4/2014 | Gruber | ................. | H04W 24/00 455/435.1 |
| 2014/0118239 A1 * | 5/2014 | Phillips | .................. | G06F 9/452 345/156 |

(Continued)

*Primary Examiner* — Khanh Q Dinh
(74) *Attorney, Agent, or Firm* — Lindauer Law, PLLC

(57) ABSTRACT

Mobile devices executing applications utilize data services worldwide. The application executing on these mobile devices may be tested using proxy access devices (PADs) located at various points-of-presence (POPs) at different geolocations. A plurality of PADs in a high density configuration are managed to provide a pool of accessible devices at a POP for developers to utilize in testing. The PADs may comprise consumer-grade devices which individually are less reliable than that desired by an operator of the POP. Systems are used to provide a desired level of reliability by maintaining a reserve of additional PADs, automatically fixing problems, generating trouble tickets for more detailed troubleshooting, and so forth.

20 Claims, 9 Drawing Sheets

(56) References Cited

U.S. PATENT DOCUMENTS

| | | | |
|---|---|---|---|
| 2014/0184757 A1* | 7/2014 | Haisty | H04N 9/3147 |
| | | | 348/51 |
| 2016/0100022 A1* | 4/2016 | Kim | H04L 67/28 |
| | | | 709/227 |
| 2018/0191742 A1* | 7/2018 | Dawes | G05B 15/02 |
| 2018/0191807 A1* | 7/2018 | Dawes | H04L 67/12 |

* cited by examiner

SYSTEM FOR MANAGEMENT OF AN ARRAY OF PROXY ACCESS DEVICES

PRIORITY

This application claims priority to U.S. Provisional Patent Application No. 62/303,337 filed on Mar. 3, 2016 entitled "System for Management of an Array of Proxy Access Devices", which is incorporated by reference herein in its entirety.

INCORPORATION BY REFERENCE

U.S. Non-Provisional patent application Ser. No. 14/850,798, now U.S. Pat. No. 9,681,318, filed Sep. 10, 2015, and titled "System for Application Test" is hereby incorporated by reference in its entirety.

U.S. Non-Provisional patent application Ser. No. 14/976,480, now U.S. Pat. No. 9,749,888, filed Dec. 21, 2015, and titled "System for Network Characteristic Assessment" is hereby incorporated by reference in its entirety.

U.S. Provisional Patent Application No. 62/298,820 filed Feb. 23, 2016 and titled "Adaptive Application Behavior Based on Assessed Network Characteristics" is hereby incorporated by reference in its entirety.

BACKGROUND

Mobile devices executing applications that utilize networks during operation to transfer data may experience failures or otherwise produce adverse user experiences as a result of network conditions. Gathering information at the mobile device about characteristics of the network may be useful to prevent or mitigate the impact of failures.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
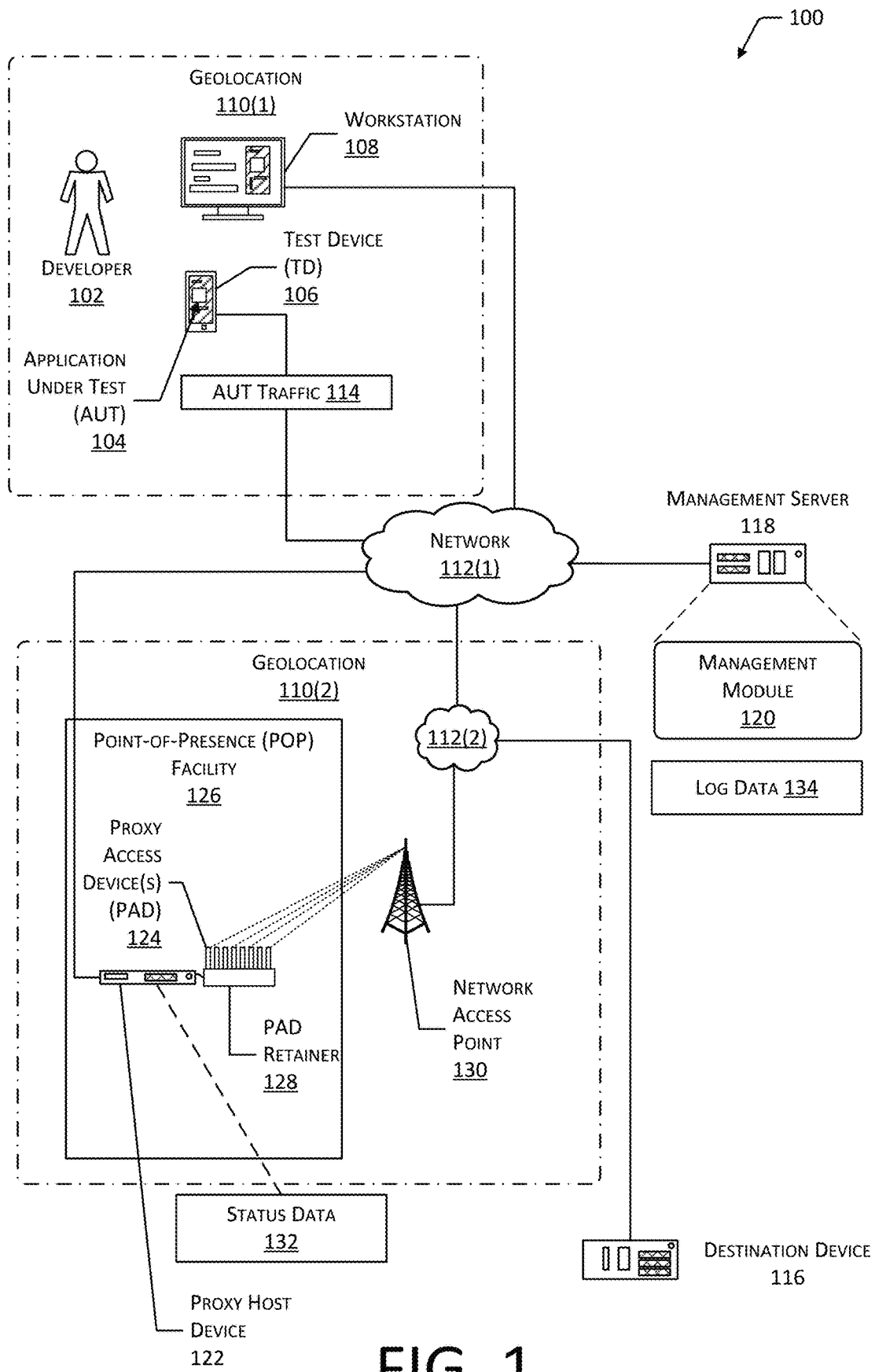
FIG. 1 depicts a system for testing mobile devices using an array of proxy access devices (PADs), according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Mobile devices may execute an application to provide various functions. These mobile devices may include, but are not limited to, smartphones, laptops, tablet computers, embedded devices, wearable computing devices, appliances, automobiles, aircraft, and so forth. Functions provided by the application may involve retrieval of data, presentation of that data to a user, processing of data, and so forth.

Some applications may communicate with one or more external devices, such as a server, using a network. For example, a navigation application may use the network to send location information to an application server that is indicative of a position of a mobile device and receive map data to present on a display of the mobile device. Problems with this communication may result in the application failing to perform the desired function, error messages, improper operation, and so forth. Continuing the example above, a long latency or delay in receiving the map data may cause the application on the mobile device to present an error to the user. These problems may result in an adverse user experience. For example, the user may discontinue using the application because of these problems and instead use another application.

Some problems that the application may encounter while using the network may not be immediately perceived by the user. For example, the application may drain the battery of the mobile device more quickly by resending data due to communication problems with the network.

The network used by the computing device to access the external device may include a wireless wide area network (WWAN), such as a wireless cellular data network (WCDN). For example, the mobile device may comprise a smartphone that accesses a WCDN provided by a telecommunication company. By using the WCDN, the smartphone is able to send and receive data with other devices, such as those accessible on the Internet. In other implementations, a local network such as a wireless local area network (WLAN) may be used to send and receive data with other devices. For example, the mobile device may access a Wi-Fi hotspot in a common area such as an airport, train station, aircraft, train, and so forth.

Performance of the network used by the computing device executing the application may be variable due to many factors. These factors may include the geographic location (geolocation) of where the computing device is located while communicating with the network, the network access point in use, congestion at the network access point, congestion at the interconnect that connects the WCDN or WLAN to another network such as the Internet, capability of the network access point, and so forth. For example, during a morning commute, many users may be streaming video content to their mobile devices, resulting in overall network congestion. In another example, the telecommunication company may have some network access points that support 3G data transmission and are relatively more congested while other network access points are able to support 4G data transmission and are relatively less congested.

Network characteristics may include information associated with the transfer of data using the network. For example, the network characteristics may include, but are not limited to, bandwidth, latency, number of packets sent, packet loss, transmit power, received signal strength, jitter, and so forth. The network characteristics for a particular connection between a network access point and a communication interface of a computing device may be available locally, but may be difficult or impossible to provide to a developer or other entity associated with maintaining the application or the computing device.

The network characteristics, or information based on the network characteristics, may be very useful to a user of the computing device, developers of the application, or other entities. For example, detailed network characteristics may provide a developer with insight that particular areas in a particular city have poor cellular or Wi-Fi data coverage. Using this information, the developer may take measures to improve the user experience, such as modifying operation of the application, working with the telecommunication company to improve coverage, and so forth.

To facilitate testing of applications, including the acquisition of real-world network characteristics, a point-of-presence (POP) facility may be located at a particular geolocation. The POP facility may include a proxy host device that is connected to a plurality of proxy access devices (PADs). A developer may execute an application under test on a test device at a first geolocation. For example, the test device may comprise the developer's smartphone. Traffic from the application under test may be directed through a first network to a POP facility at a second geolocation. At the POP facility, a PAD is used to connect to a second network, such as a WCDN of a particular carrier using a particular communication mode or a WLAN. The second network by way of the PAD is then accessible by the test device. During operation, the test device may exchange traffic with a destination device using the PAD at the second geolocation. Network characteristics associated with this traffic may be obtained and used to generate data. The system allows the developer to test the application as if it were operating at various different geolocations without ever leaving their office.

The system may be designed to support numerous testing sessions at a POP facility by maintaining a pool of available PADs. During an individual session, one of the available PADs may be used. The PADs may comprise cellphones, smartphones, tablets, or other devices. The PADs may or may not be the same make, model, manufacture, and so forth of the test device. For example, the test device may comprise a high-end tablet device while the PAD may comprise an inexpensive smartphone.

A POP facility may include an array of many PADs to satisfy demand. For example, the POP facility may include any number of PADs, such as 64 or more PADs. A PAD retainer may be used to maintain the plurality of PADs in a high density physical configuration that facilitates cooling of the individual PADs, maintenance, and so forth.

By using the systems and devices described herein, POP facilities for testing applications for a mobile device may be quickly and easily deployed and maintained. Large numbers of PADs may be arranged within a relatively small volume improving the availability of PADs for testing while also more efficiently utilizing volume within the POP facility. By using output data generated from the testing, network access problems may be identified, the user experience of the application may be improved, power consumption of mobile devices may be reduced, and so forth.

Described in this disclosure are techniques and systems to manage the plurality of PADs in order to provide an environment for testing. PADs may be added to a POP facility to provide capacity for developers to test and to provide for redundancy. The number of PADs at a POP facility may be sufficient to accommodate the occasional failure of one or more individual PADs while still maintaining a desired level of service to the developers.

PADs at the POP facility may be monitored by an automated system to categorize the operational state of the PADs and allocate them across different pools, according to the operational state. An operational pool includes those PADs that are functioning within specified parameters. The operational pool may include a pool of PADs that are in use as well as an available pool of devices that are ready for use but are not otherwise occupied. A repair pool comprises those devices that have been determined to require some sort of mitigating action before restoring them to the operational pool. An out of service pool comprises those devices that have been determined to continue to fail following one or more of the mitigating actions.

Determination of the operational state may include a comparison of data about the PAD with one or more threshold values. For example, the data may indicate that the PAD has not provided a heartbeat packet within a threshold amount of time. As a result, that PAD may be categorized to the repair pool. The mitigation actions may include one or more of resetting a communication port used to communicate with the PAD, increasing a data transfer quota of an account with the telecommunication carrier that is associated with the PAD, restarting the PAD, resetting the PAD, erasing the PAD, installing an application on the PAD, and so forth.

If the mitigation actions fail, a trouble ticket may be generated. The trouble ticket may then be handled, such as by a human operator, to either repair or replace the PAD.

During use of the system described herein, the developer may use a user interface to specify various testing parameters. For example, the developer may select a desired geolocation of the PAD to use for testing, a particular communication carrier, a particular communication mode, and may select from one or more virtual devices.

The proxy host device may present one or more of the virtual devices for use. The virtual device is associated with a first PAD, and the first PAD is used to access the WCDN or WLAN. During use, a session is established between the test device and the virtual device. In the event of a failure of a first PAD during the operation of the session, the virtual device may transition from using the first PAD to using a second PAD to access the WCDN or WLAN. In some implementations, this transition may be presented to the test device as a temporary loss of connection. The application under test may respond to this loss of connection by trying to reestablish a connection. The resulting reestablished connection remains to the virtual device, but is now being passed through the second PAD. As a result of this ability to fail over to another available PAD, the developer sees a high degree of reliability and is able to continue testing. As described above, the first PAD may be transitioned to the repair pool and subsequent mitigation actions may be taken.

Use of the system allows for rapid deployment of POP facilities while also streamlining the administration of the PADs at those POP facilities. Downtime of the system may be minimized. Operational expenditures associated with human operators at the POP facilities may also be reduced by using automated mitigation for many problems. As a result, the time of the human operators is freed up to address more complicated troubleshooting, provisioning of new PADs, or other activities.

The system described in this disclosure thus allows for the deployment, management, and usage of arrays of PADs. Relatively inexpensive hardware may be used as the PADs and the failure of any given PAD may be addressed and mitigated to maintain overall availability of the system to support a service level called for by the developer.

FIG. 1 depicts a system 100 for testing mobile devices using an array of proxy access devices (PADs), according to one implementation. A developer 102 may be an individual, group of individuals, or entity that is tasked with creating a new application, maintaining an existing application, re-factoring an existing application, and so forth. The developer 102 may be working on an application under test (AUT) 104. The AUT 104 may be executed on a computing device such as a test device (TD) 106, a workstation 108, and so forth. For example, the TD 106 may comprise a mobile device such as a smartphone, tablet computer, wearable computing device, and so forth. The workstation 108 may comprise a laptop, desktop computer, and so forth.

The AUT 104 may be an application that is at any stage in a development or maintenance lifecycle. For example, the AUT 104 may comprise an alpha (or prerelease) version of software, or may comprise a previously released production version that is undergoing further testing.

The workstation 108 may include an integrated development environment (IDE) to facilitate the creation and editing of program code, debugging, compiling, and so forth. In some implementations, the workstation 108 may comprise an emulator or simulator that is designed to execute the AUT 104 as if it were executing on another piece of hardware, under a different operating system, and so forth.

The developer 102 may test the AUT 104 to determine problems associated with use of the AUT 104. Once those problems have been determined, they may be mitigated. For example, the developer 102 may change the program code of the AUT 104 to remedy the problem. The developer 102 may use the system described below to determine at least some of the problems associated with operation of the AUT 104.

One or more of the developer 102, the TD 106, or the workstation 108 may be located at a first geolocation 110(1). The geolocation 110 comprises a geographic location, such as a particular room, building, city, state, country, and so forth. For example, the geolocation 110 may be specified by a set of coordinates with regard to latitude and longitude on the surface of the Earth.

One or more of the TD 106 or the workstation 108 may be connected to a first network 112(1). The first network 112(1) may, in turn, be connected to or be part of a larger network. For example, the first network 112(1) may comprise the Internet. The connection used by the TD 106 or the workstation 108 may include, but not limited to, a wired Ethernet connection, a wireless local area network (WLAN) connection such as Wi-Fi, and so forth. For example, the first geolocation 110(1) may comprise an office where the developer 102 is working. The TD 106 may connect to a local Wi-Fi access point that is connected via Ethernet cable to a router. The router, in turn, is connected to a cable modem that provides connectivity to the Internet.

During operation, the AUT 104 may rely on access to an external resource, such as a destination device 116. For example, the AUT 104 may comprise a social networking application that sends data generated by a user and retrieves information from a server. As a result, in some implementations, the AUT 104 may require access to the destination device 116 for normal operation.

A single destination device 116 is depicted for ease of illustration and not necessarily as a limitation. For example, the AUT 104 may exchange AUT traffic 114 with many different destination devices 116 during operation.

The AUT 104 may generate AUT traffic 114 that is exchanged with the destination device 116 during operation. Traditionally, the AUT traffic 114 generated by the TD 106 or the workstation 108 at the first geolocation 110(1) would be sent to the first network 112(1) and onto the destination device 116. However, this traditional situation limits the ability to generate test data to the first geolocation 110(1).

To provide the functionality described herein, the developer 102 may incorporate a software development kit (SDK) into the AUT 104. For example, at compile time, the SDK may be included into the compiled AUT 104. In other implementations, techniques other than an SDK may be used to provide the functionality described herein. For example, lines of computer code that provide the functionality of at least a portion of the SDK may be incorporated into the code base of the AUT 104.

The SDK is configured to provide a user interface to the developer 102 that allows for the redirection of the AUT traffic 114. The SDK may comprise instructions to establish communication with the management server 118. For example, the SDK may add a user interface that allows the developer 102 to interact with the management module 120.

The management server 118 utilizes the management module 120 to coordinate the activities of one or more proxy host devices 122 or proxy access devices (PADs) 124. The proxy host device 122 connects to the first network 112(1) and also to one or more PADs 124. Any number of PADs 124 may be tethered to the proxy host device 122. For example, the proxy host device 122 may comprise a server to which 64 PADs 124 are tethered by way of universal serial bus (USB) cables.

The proxy host device 122 and the attached PADs 124 may be located at a point-of-presence (POP) facility 126 present at a second geolocation 110(2) that is different from the first geolocation 110(1) of the TD 106. For example, the POP facility 126 may be located within a datacenter, structure, vehicle, or portable system present at the second geolocation 110(2) in another city, state, country, and so forth.

In some implementations, it may be advantageous to provide testing in a mobile situation. One or more mobile POP facilities 126 may be located onboard a vehicle. For example, the vehicle may include a private conveyance such as a personal automobile, a conveyance for hire such as a taxi or rideshare vehicle, bus, train, aircraft, boat, submarine, lighter than air craft, hovercraft, and so forth. In another implementation the mobile POP may be part of a portable device such as implemented in a form factor of a carrying case, a backpack, and so forth. For example, the mobile POP may fit within a satchel or backpack to facilitate testing in pedestrian-only areas.

The POP facility 126 may maintain one or more proxy host devices 122, along with a plurality of PADs 124. A PAD retainer 128 may be used to maintain the plurality of PADs 124 in a high density physical configuration that facilitates operation. For example, the PAD retainer 128 may be configured to provide physical support and separation between individual PADs 124 while providing sufficient clearance for cooling, emission of radio signals, to allow for viewing at least a portion of the display device or other output device of the PAD 124 for maintenance purposes, to provide routing for cabling associated with tethering the PAD 124 to the proxy host device 122, to facilitate identification of a particular PAD 124 for maintenance purposes, and so forth. The PAD retainer 128 is described in more detail below with regard to FIGS. 2-9.

The PADs 124, in turn, are able to connect to a network access point 130. The network access point 130 provides connectivity to a second network 112(2). For example, the PADs 124 may comprise commodity cellphones, the network access points 130 may comprise cell phone towers, and the second network 112(2) may comprise a WWAN, such as a wireless cellular data network (WCDN). In other implementations, the second network 112(2) may comprise a network that includes a wireless local area network (WLAN). The second network 112(2) may in turn be connected to the first network 112(1). For example, the WCDN operated by a telecommunication company may interconnect or have a peering agreement with an Internet backbone provider. As a result, a user of the second network 112(2) may be able to access resources on the first network 112(1), and vice versa.

Returning to the AUT 104, as part of the testing process, the developer 102 may use the user interface to access the management module 120 of the management server 118. From the user interface, the developer 102 may select one or more of a particular geolocation 110 or virtual device to use during testing. The management module 120 may maintain information about the PADs 124 associated with those virtual devices, such as geolocation 110, availability, cost, type of PAD 124, and so forth.

The management module 120 may coordinate establishment of a session between the AUT 104 and a virtual device. The virtual device may be selected by the developer 102. The virtual device in turn is associated with one or more PADs 124. For example, based on the selection of the virtual device by the developer 102, the management module 120 may determine the proxy host device 122 and retrieve information such as digital certificates, cryptographic credentials, network address, and so forth. In one implementation, the management module 120 may communicate with the proxy host device 122 to prepare the proxy host device 122 for communication with the AUT 104. In another implementation, the management module 120 may provide configuration data to the AUT 104, which in turn connects to the proxy host device 122 and sends the configuration data. In other implementations other connection methodologies may be utilized.

During testing, the AUT traffic 114 may be routed through the first network 112(1) to the proxy host device 122, through the PAD 124 to the second network 112(2), and ultimately arrive at the destination device 116. The AUT traffic 114 may include outbound application traffic and inbound application traffic. The outbound application traffic may comprise data that is sent from the AUT 104 to the destination device 116. The inbound application traffic may comprise data that is sent from the destination device 116 to the AUT 104. During operation, the AUT 104 directs the outbound application traffic to the proxy host device 122 associated with the selected PAD 124. The proxy host device 122 in turn transfers the outbound application traffic to the selected PAD 124, which then sends the outbound application traffic to the second network 112(2). The second network 112(2) may then send the outbound application traffic to the destination device 116. Inbound application traffic from the destination device 116 may follow the reverse path or another path on return.

During operation of the system 100, status data 132 may be obtained. The status data 132 comprises information indicative of one or more of the devices such as the proxy host device 122, proxy access device 124, and so forth. The status data 132 may be used by the proxy host device 122 as discussed in more detail below with regard to FIGS. 3-4.

The management server 118 may collect log data 134 associated with operation of the system 100. The log data 134 may include proxy session data. The proxy host device 122 may be configured to generate the proxy session data. The proxy session data may include "breadcrumb" data, information associated with operation of the PAD 124, packet capture of data transferred by the proxy host device 122, and so forth. The breadcrumb data may include, for a particular instant or interval of time, one or more of: a current page on a website, type of network that the PAD 124 is connected to, quantity of data received, quantity of data transmitted, latency to the destination device 116, data throughput, received signal strength, transmit power, cost associated with data transfer on the second network 112(2), and so forth. For example, the breadcrumb data may indicate that the PAD 124 was connected at timestamp 201508172312030092 to webpage http://www.example-.com/main.html using a 3G network connection with a received signal strength of 14 dBm, a transmit power of 7 dBm, data throughput of 400 Kbps, and so forth. The proxy session data is thus the product of the AUT 104 operating on a real-world second network 112(2) at a desired geolocation 110. The resulting proxy session data is representative of the real world, including the complexities and nuances associated therewith.

The management server 118 may obtain the proxy session data. For example, the proxy host device 122 may stream the proxy session data to the management server 118 during the test session. In another example, the management server 118 may poll the proxy host devices 122.

The management server 118 may include an analysis module to process the proxy session data and generate report data. For example, the analysis module may parse the proxy session data to determine a first timestamp of when a first request was sent and a second timestamp of when a first response to the first request was received. Based on the first timestamp and the second timestamp, a latency to fulfill the request to the second network 112(2) may be determined.

In some implementations, the report data may specify one or more optimizations of possible modifications to the AUT 104. For example, the report data may specify a particular portion of the AUT 104 that is generating requests with latencies over a threshold value.

During testing, the developer 102 may acquire the proxy session data. For example, the developer 102 may use the TD 106 to execute the AUT 104 and test different geolocations 110.

The PADs 124 are administered at least in part by the proxy host device 122. As described above, the proxy host device 122 may obtain status data 132 from and about the PADs 124 and may designate the PADs 124 as being in use, available for use, designated for repair, or designated as out of service. The proxy host device 122 may then perform various functions based on the pool in which the PAD 124 is allocated. For example, mitigating actions may be performed on the PADs 124 allocated to the repair pool in an attempt to restore them to an available pool for further use by developers 102. These actions are discussed in more detail below with regard to FIG. 3 and later.

Figure 2:
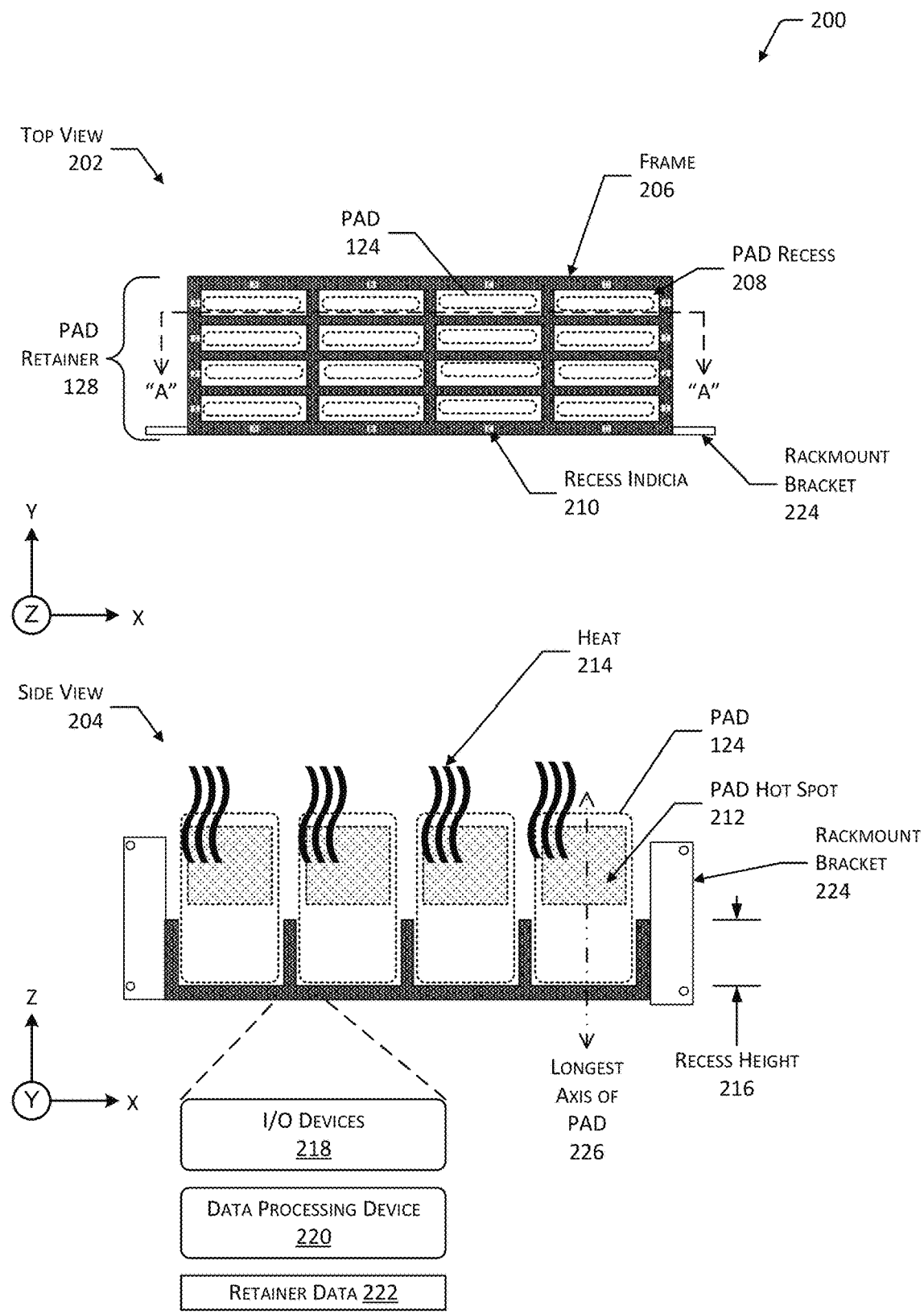
FIG. 2 depicts two views of a PAD retainer that may be used at a point-of-presence (POP) to mount the array of the PADs, according to one implementation.

FIG. 2 depicts two views of an implementation 200 of a PAD retainer 128 that may be used at a POP facility 126 to mount the array of PADs 124. A top view 202 and a side view 204 along line A-A of the PAD retainer 128 are depicted. For clarity of illustration and not as a limitation, tether cables to connect the PAD 124 to the proxy host device 122 may be omitted.

The PAD retainer 128 comprises a frame 206 or a body. The frame 206 may comprise a single unitary piece or may comprise a plurality of pieces. For example, the frame 206 may comprise a base, walls, partitions, and so forth. Different portions of the frame 206 may comprise different materials. For example, the walls of the frame 206 may comprise a material that is substantially transparent to radio frequencies associated with operation of one or more radios within the PADs 124. Substantially transparent may include materials that produce some attenuation to the passage of signals in the radio frequencies associated with operation. For example, the material may be deemed to be substantially transparent if the attenuation is less than 3 dB.

The material of the frame 206 may comprise one or more of a plastic, ceramic, wood, paper, glass, composite material, and so forth. For example, at least a portion of the frame 206 may comprise an expanded polystyrene (EPS) material. In other examples, at least a portion of the frame 206 may comprise cardboard, corrugated plastic sheets, and so forth. In some implementations, the material may be infused, mixed, coded, or otherwise treated with a fire retardant or combustion inhibitor.

The frame 206 may itself be solid or porous to light, air, fluid, and so forth. In one implementation, the frame 206 may comprise a latticework structure that provides physical support while allowing the passage of ambient air between the support members of the latticework. In other implementations, the frame 206 may comprise a foam having pores through which ambient air may move, perforated plastic, and so forth. In another implementation, the frame 206 may comprise a non-porous structure, such as an unbroken sheet of EPS.

In some implementations, the material may comprise an electrically conductive material. For example, the material may comprise a steel mesh that has one or more openings. The size of the openings may be such that they permit passage of the wavelength of radio frequencies associated with operation of the PADs 124. For example, the openings may have a width greater than a wavelength of the radio frequency.

While the frame 206 is depicted here having an overall shape of a rectangle, the frame 206 may have a perimeter that describes other polygons. For example, the frame 206 may have an overall shape of a square, triangle, hexagon, circle, and so forth. In some implementations, the overall shape of the frame 206 may be configured to form part of a space filling tessellation or tiling to facilitate a high packing density.

The frame 206 is arranged to provide one or more PAD recesses 208. As illustrated in this depiction, PAD recesses 208 are arranged in a generally regular pattern of rows and columns. Each PAD recess 208 comprises a width, length, and height suitable to accept at least a portion of the PAD 124, such as a first end. In some implementations, the PAD recess 208 may be larger than the external dimensions of the PAD 124. For example, the PAD recess 208 may provide 2 to 10 millimeters (mm) of clearance between an outer case of the PAD 124 and the walls of the PAD recess 208. In other implementations, the PAD recess 208 may be slightly smaller than the external dimensions of the PAD 124. The material of the frame 206 may be slightly compressible, allowing the PAD recess 208 to snugly fit and engage the PAD 124 to minimize motion therein. For example, the walls of the PAD recess 208 may comprise a foam that is at least partially compressible and that returns to substantially the same shape upon removal of the compression. The PAD 124 may be inserted at least partially into the PAD recess 208 where the foam slightly compresses and exerts a pressure against two or more of the sides of the PAD 124.

In some implementations, the PAD retainer 128 may include or incorporate wiring, connectors, and so forth, suitable to provide the connection between the proxy host device 122 and the PADs 124 stowed therein. For example, the PAD recess 208 may include a connector that has a first end configured to couple to the PAD 124 and a second end configured to couple to another device, such as the proxy host device 122. When the PAD 124 is coupled to the connector, communication may be established between the PAD 124 and an external device such as the proxy host device 122. In some implementations, the connectors may be rigidly affixed within the PAD recess 208, or may have a flexible or wired end.

One or more recess indicia 210 may be associated with the PAD retainer 128. The recess indicia 210 provide an indication that may be used to locate a particular PAD recess 208 within the PAD retainer 128. The recess indicia 210 may facilitate maintenance of the POP facility 126 by allowing an operator to quickly access a particular PAD 124. For example, the recess indicia 210 when combined with a PAD retainer indicia (not shown) may be used by a human or robotic attendant to find and replace a PAD 124 that has malfunctioned.

The recess indicia 210 may comprise one or more human-readable symbols configured to identify individual ones of the PAD recesses 208 within the frame 206. For example, the recess indicia 210 may comprise Arabic numbers indicating particular rows and English letters indicating particular columns, or associated with each of the one or more of the individual PAD recesses 208. The recess indicia 210 may comprise machine-readable symbology. For example, the recess indicia 210 may comprise a two-dimensional barcode. Barcodes may be associated with rows, columns, or one or more of the individual PAD recesses 208. The machine-readable symbology may be suitable for detection and readout by devices such as cameras.

Each of the PADs 124 may exhibit one or more PAD hot spots (hot spot) 212. The PAD hot spots 212 comprise areas or regions of the PAD 124 in which heat 214 is radiated during operation. During use of the PAD 124, electrical power used to operate the components of the PAD 124 may be dissipated at least in part as heat 214. This heat 214 is emitted from the PAD 124. Due to design considerations of the particular PAD 124, the heat 214 may be dissipated at the PAD hot spots 212. For example, the PAD hot spot 212 may correspond to a heat sink of the PAD 124.

The PAD recesses 208 within the frame 206 are configured with a recess height 216 that allows for the PAD hot spots 212 to be substantially exposed to the ambient environment. In one implementation, a recess height 216 of each PAD recess 208 is less than or equal to a distance from a first end of a PAD 124 to a first edge of an area designated as a hot spot 212 on the PAD 124. As a result, at least a portion of the area designated as the PAD hot spot 212 is exposed to ambient air during operation.

In some implementations, the recess height 216 of each PAD recess 208 may be greater than or equal to a distance from a first end of the PAD 124 to an edge of an area designated as a hot spot 212 on the PAD 124, wherein the edge is distal from the first end and proximate to a second end of the PAD 124.

In some implementations, some of the PAD recesses 208 within the PAD retainer 128 may have different recess heights 216. For example, a first PAD recess 208(1) may have a first recess height 216(1) that is less than a second recess height 216(2) in a second PAD recess 208(2). The different recess heights 216 may be configured to accommodate PADs 124 with different placement of PAD hot spots 212, of differing size, and so forth. In some implementations, removable spacers may be inserted into or removed from the PAD recesses 208 to change the recess height 216.

In some implementations, the frame 206 may comprise a reconfigurable structure. The frame 206 may comprise blocks of material that may be added or removed to vary one or more of the size or shape of the PAD recess 208. For example, the frame 206 may comprise blocks that adhere to one another or a portion of the frame 206 using a hook and loop fastener, mechanical engagement feature such as slots or pegs, and so forth.

The exposure of the PAD hot spot 212 that results from the recess height 216 allows the heat 214 from the PADs 124 to be dissipated in the surrounding atmosphere. By dissipating the heat 214, the PADs 124 are sufficiently cooled and overheating as well as subsequent shutdown or damage of the PADs 124 is prevented.

In other implementations, the recess height 216 may be such that the height of the frame 206 extends above at least a portion of the PAD hot spot 212. For example, the PAD hot spot 212 may be somewhat ambiguously defined, changing with the operation of the PAD 124, varying with the placement of the PAD 124 within the PAD recess 208, and so forth. However, in this implementation the recess height 216 is sufficient to allow for dissipation of the heat 214 from the PAD 124, allowing for operation of the PAD 124 without adverse effects.

In some implementations, the PAD retainer 128 may include one or more devices. These devices may include one or more input/output (I/O) devices 218, one or more data processing devices 220, and so forth. The I/O devices 218 may include sensors, displays, speakers, and so forth. For example, the sensors may include one or more of: a thermocouple, a photosensor, a camera, a near field communication (NFC) sensor, a radio frequency identification device (RFID), an accelerometer, proximity sensor, switches, and so forth.

The data processing device 220 may include at least one processor executing instructions to generate retainer data 222 based at least in part on the output from the one or more sensors. The retainer data 222 may be transferred to the proxy host device 122 by way of one or more communication interfaces.

In some implementations, the data processing device 220 may be used to generate output. The output devices may include light emitting diodes, liquid crystal displays, piezoelectric speakers, and so forth. For example, the data processing device 220 may activate one or more light-emitting diodes to emit light, indicating the location of a particular PAD recess 208. An operator of the POP facility 126 may use the light to more easily and accurately find the particular PAD recess 208.

The thermocouple may be used to provide retainer data 222 indicative of a temperature at one or more of the PAD recesses 208 or other locations at or near the PAD retainer 128. For example, a thermocouple or other temperature sensing device may be arranged within one or more of the PAD recesses 208 to provide external verification of the temperature of a particular PAD 124.

The photosensor may be used to detect light emitted from an output device of the PAD 124, such as a display screen, light-emitting diode, and so forth. For example, the photosensor may provide retainer data 222 that is useful to determine if a display screen of the PAD 124 has been activated to present a predominantly white image. This retainer data 222 may be used to verify operation of the display device on the PAD 124.

The camera may be used to acquire images of at least a portion of the frame 206, the PAD recesses 208, and any PADs 124 stowed therein. For example, the camera may be used to take a picture of a display device of one or more of the PADs 124 to provide verification of operation. In another example, the camera may be used to take a picture that is used for inventorying or otherwise confirming the presence of a PAD 124 at a particular PAD recess 208. In some implementations, a picture from the camera may be used to generate inventory data. For example, each PAD 124 may include a machine-readable symbology such as the barcode that, when combined with the recess indicia 210, may be used to associate a particular PAD 124 with a particular PAD recess 208.

One or more of the NFC or RFID sensors may be used to determine the presence of a PAD 124, as well as information about that PAD 124. For example, the NFC or RFID sensors may be used to generate an inventory of identifiers that are indicative of particular PADs 124 that are present at the PAD retainer 128. Data indicative of the output from these sensors may be provided as retainer data 222 to the proxy host device 122 or other devices such as the management server 118. Using this retainer data 222, an inventory of the PAD 124 present at the PAD retainer 128 may be determined.

The accelerometer may provide retainer data 222 that is indicative of motion of one or more of a PAD 124 stowed within the frame 206 or the frame 206 itself. One or more accelerometers may be positioned at various points within the frame 206. Activation of a haptic output device of one of the PADs 124 may generate a vibration that is detectable by one or more of the accelerometers. For example, a particular PAD 124 may be commanded by the proxy host device 122 to generate a haptic output using an eccentric mass rotated by an electric motor within the particular PAD 124. The retainer data 222 obtained from the accelerometer may be used to verify this operation.

Other sensors such as a proximity sensor, switches, and so forth, may also be used to generate retainer data 222. For example, a proximity sensor may be used to determine if a PAD 124 is present within a particular PAD recess 208. The proximity sensor may be a contact proximity sensor or a noncontact proximity sensor.

By using the retainer data 222, one or more of proxy host device 122, the management server 118, or the developer 102 may better able to administer and manage the PADs 124 in the POP facility 126, determine the physical impacts of testing on the PADs 124, and so forth.

One or more brackets may be affixed to, integral with, or supportive of the frame 206. In this illustration, rackmount brackets 224 are depicted on either side of the PAD retainer 128. The rackmount brackets 224 may comprise one or more mechanical engagement features suitable for attachment to a standardized equipment rack. For example, the rackmount bracket 224 may be compliant with at least a portion of the EIA-310 specification as promulgated by the Electronic Industries Alliance (EIA). Mechanical engagement features may include, but are not limited to, threaded holes, bolts tabs, latches, pegs, rails, and so forth.

In some implementations, the frame 206 may be supported at least in part by a computing device, such as the proxy host device 122. For example, the frame 206 may rest atop or be mounted to a surface of the proxy host device 122. The proxy host device 122 may itself have dimensions compliant with a standardized equipment rack specification.

In yet another implementation, the rackmount brackets 224 may be omitted and the frame 206 may be supported by a shelf or drawer. For example, a shelf that is compliant with at least a portion of EIA-310 may be mounted to a rack. The frame 206 may then rest upon that shelf.

In some implementations, PADs 124 may be oriented upside down within the PAD recesses 208. For example, a top or upper portion of the PAD 124 may come in contact with the bottom of the PAD recess 208 when stowed within the PAD retainer 128. For example, the PAD 124 may be oriented with a longest axis of the PAD 226 at an angle of less than 70° from a vertical line extending perpendicular to a plane of a base of the frame 206.

An enclosure (not shown) may also be used. In some implementations, a portion of the frame 206 may be used to form the enclosure. For example, the portion of the frame 206 along the perimeter may be extended in height relative to interior partitions that form the PAD recesses 208.

By utilizing the PAD retainer 128 described above, a POP facility 126 may be operated that maintains a relatively large number of PADs 124 in a configuration that allows for their operation without damage.

Figure 3:
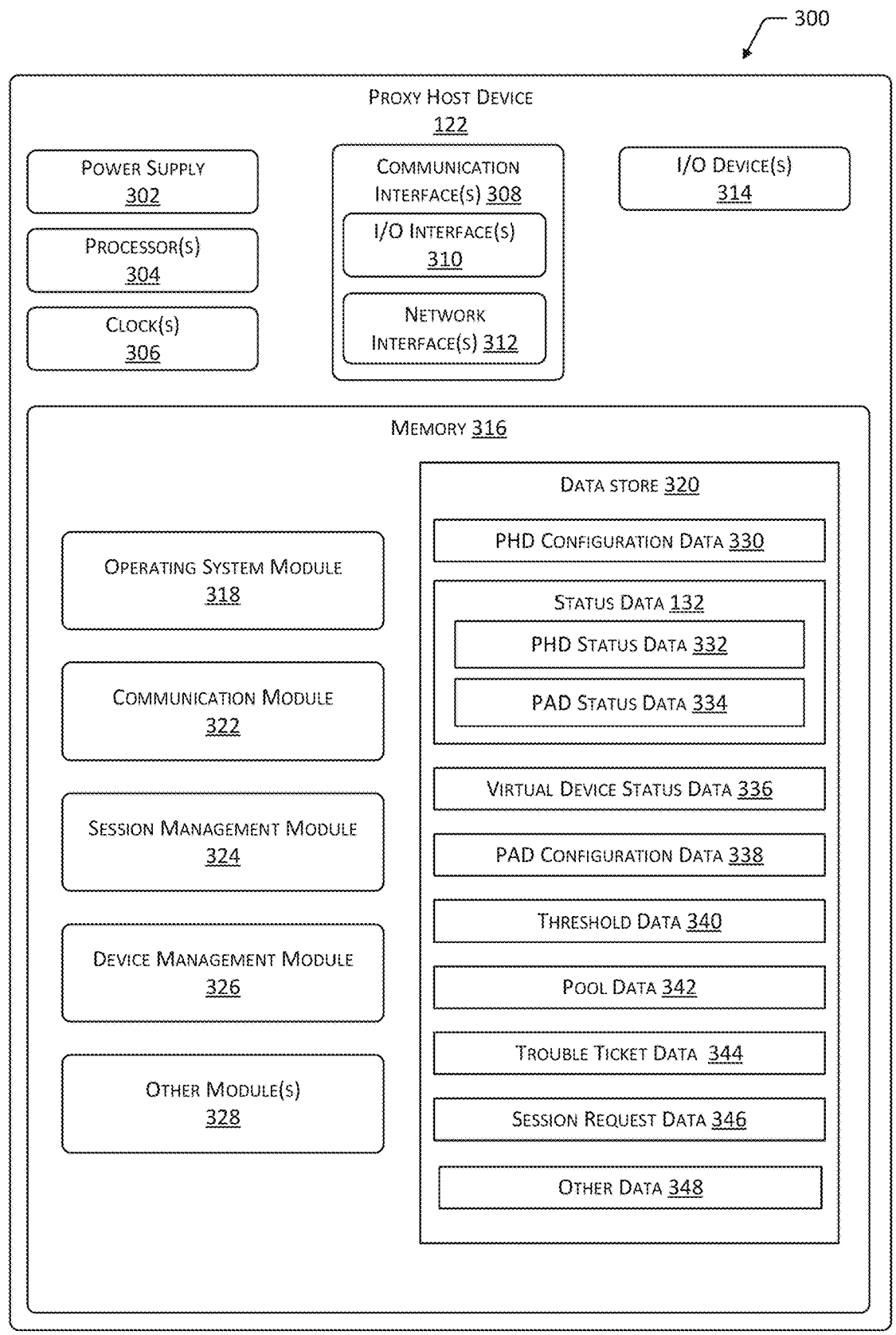
FIG. 3 is a block diagram of a proxy host device (PHD) that maintains an array of PADs, according to one implementation.

FIG. 3 is a block diagram 300 of a proxy host device (PHD) 122 that maintains an array of PADs 124, according to one implementation. The proxy host device 122 may be implemented using a variety of different types of form factors. For example, a proxy host device 122 may comprise a mini desktop computer, a tablet computer, a server, an embedded device, and so forth.

One or more power supplies 302 may be configured to provide electrical power suitable for operating the components of the proxy host device 122. In some implementations, the power supply 302 may include a rechargeable battery, fuel cell, photovoltaic cell, power conditioning circuitry, and so forth. Some implementations of the proxy host device 122 may provide electrical power to the PADs 124 that are coupled thereto. For example, power may be provided to the PADs 124 by way of a USB connection.

The proxy host device 122 may include one or more hardware processor(s) 304 (processors) configured to execute one or more stored instructions. The processor(s) 304 may include one or more cores. One or more clocks 306 may provide information indicative of date, time, ticks, and so forth. For example, the processor(s) 304 may use data from the clock 306 to generate a timestamp, determine an elapsed time, trigger a preprogrammed action, and so forth.

The proxy host device 122 may include one or more communication interfaces 308, such as input/output (I/O) interfaces 310, network interfaces 312, and so forth. The communication interfaces 308 may enable the proxy host device 122, or components of the proxy host device 122, to communicate with other devices or components of the proxy host device 122. The I/O interfaces 310 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include any manner of input device or output device associated with the proxy host device 122. For example, I/O devices 314 may include touch sensors, keyboards, mouse devices, microphones, image sensors (e.g., cameras), scanners, displays, speakers, haptic devices, printers, positioning devices, and so forth. The positioning device may comprise one or more of a satellite radionavigation system, inertial navigation system, terrestrial radionavigation system, or other device configured to generate data indicative of the geolocation 110. For example, the satellite radionavigation system may comprise a Global Positioning System (GPS) receiver, the terrestrial radionavigation system may utilize information from the network access points 130, and so forth. In some implementations, the I/O devices 314 may be physically incorporated with the proxy host device 122 or may be externally placed. For example, the I/O interface 310 may connect to the data processing device 220 to receive retainer data 222 from with the PAD retainer 128.

The network interfaces 312 may be configured to provide communications between the proxy host device 122 and other devices, such as the routers, access points, and so forth. The network interfaces 312 may include devices configured to couple to one or more networks 112 including local area networks (LANs), WLANs, wide area networks (WANs), WWANs, and so forth. For example, the network interfaces 312 may include devices compatible with Ethernet, Wi-Fi, Bluetooth, ZigBee, Z-Wave, 3G, 4G, LTE, and so forth.

The proxy host device 122 may include one or more busses or other internal communications hardware or software that allows for the transfer of data between the various modules and components of the proxy host device 122.

As shown in FIG. 3, the proxy host device 122 may include one or more memories 316. The memory 316 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the proxy host device 122. A few example modules are shown stored in the memory 316, although the same functionality may alternatively be implemented in hardware, firmware, or as a system on a chip (SoC).

The memory 316 may include one or more operating system (OS) modules 318. The OS module 318 may be configured to manage hardware resource devices such as the I/O interfaces 310, the network interfaces 312, the I/O devices 314, and to provide various services to applications or modules executing on the processors 304. The OS module 318 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; the Mac OS or iOS promulgated by Apple Inc. of Cupertino, Calif., USA; or other operating systems.

A data store 320 and one or more of the following modules may also be stored in the memory 316. The modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including other computing devices, network attached storage devices, and so forth.

A communication module 322 may be configured to establish communications with one or more other devices using one or more of the communication interfaces 308. Communications may be authenticated, encrypted, and so forth. The communication module 322 may utilize digital certificates to authenticate the identity of devices involved in the communication. For example, the communication module 322 may be configured to establish a virtual private network (VPN) connection or tunnel with the test device 106, management server 118, and so forth.

Other modules stored in the memory 316 may include one or more of a session management module 324, a device management module 326, or other modules 328.

The OS module 318 or other modules may access PHD configuration data 330. The PHD configuration data 330 may comprise configuration files or other settings associated with overall operation of the proxy host device 122 used to set the overall environment or configuration of one or more of the modules.

The proxy host device 122 may generate or otherwise acquire the status data 132. The status data 132 may include one or more of PHD status data 332 or PAD status data 334. The PHD status data 332 may comprise information such as a network address of the proxy host device 122, overall operational status, information indicative of installed software, version of installed software, utilization, and so forth. The PAD status data 334 may comprise information such as make and model of the PAD 124, OS version of the PAD 124, connection status to the second network 112(2), amount of data remaining on the data transfer plan associated with an account with the telecommunication carrier that the PAD 124 is using, and so forth. In some implementations the PAD status data 334 may include information obtained from a radio, baseband communication interface, or other hardware. For example, the PAD status data 334 may include a transmitter power output, information about one or more of a physical or data link layer operation, modem settings, and so forth.

The session management module 324 and the device management module 326 operate in conjunction with one another to provide functionality to the test device 106. The proxy host device 122 may instantiate a virtual device. The session management module 324 may provide virtual device status data 336 that indicates the availability of the virtual device. In some implementations, the session management module 324 may initiate the instantiation of the virtual device. The virtual device status data 336 may also include other information about the virtual device.

The virtual device is associated with one or more PADs 124. The device management module 326 is configured to manage the PADs 124 that are connected to the proxy host device 122. The device management module 326 may use PAD configuration data 338 to configure the PADs 124 to a desired state. For example, the PAD configuration data 338 may specify a set of applications to install, data communication parameters, and so forth.

The device management module 326 assesses the operational state of the PADs 124 attached to the proxy host device 122. The operational state comprises information indicative of whether the PAD 124 is performing within specified parameters. For example, a PAD 124 may be operational, partially operational, or out of service. The device management module 326 may compare the PAD status data 334 with threshold data 340 to determine the operational state of the PAD 124. The threshold data 340 may specify one or more threshold values. The threshold values may include maximum values, minimum values, ranges of values, and so forth. For example, the PAD 124 may be deemed to be partially operational when communication between the PAD 124 and the proxy host device 122 is functional, but the PAD 124 is returning unexpected responses to commands provided by the proxy host device 122.

The device management module 326 may allocate or designate a PAD 124 as belonging to a particular pool based on the operational state or other data. This information may be stored as pool data 342. In one implementation, the pools may be designated as operational, repair, or out of service. For example, the pool data 342 may indicate that PAD 124(1) is operational and in use, PAD 124(3) is operational and available, PAD 124(5) is unavailable due to repairs, and PAD 124(7) is out of service.

The device management module 326 may perform different actions based upon the allocation of the particular PAD 124 as indicated by the pool data 342. For example, PADs 124 that are operational and designated as in use may be monitored to determine that they remain in an operational state. Continuing the example, PADs 124 that are available may be more aggressively tested until they are placed in use. The device management module 326 may initiate one or more mitigation actions for those PADs 124 associated with the repair pool, in an attempt to restore them to the operational pool.

The device management module 326, upon determining that the mitigation actions for the PAD 124 associated with the repair pool have failed, may generate a trouble ticket data 344. The trouble ticket data 344 may provide information that may be used for further troubleshooting. For example, the trouble ticket data 344 may include one or more of a PAD identifier, the physical indicia indicative of the location of the PAD 124, results of the mitigation actions taken, last known state of the PAD 124, crash dump, and so forth. The trouble ticket data 344 may be sent to another device, such as the management server 118. The management server 118 may then use the trouble ticket data 344 to take other actions, such as a dispatching a human operator to address the failure of the PAD 124 referenced in the trouble ticket data 344.

The test device 106 or another device may send session request data 346 to the session management module 324. For example, the session request data 346 may include data indicative of a particular virtual device referenced by the virtual device status data 336. Responsive to the session request data 346, the session management module 324 allocates the virtual device for use by the requester, such as the test device 106. The session management module 324 accesses the PAD status data 334 or information based thereon, and may either associate a PAD 124 from the available pool with the virtual device or may confirm that the previously associated PAD 124 remains in an operational state. Once the PAD 124 associated with the virtual device is deemed to be ready, the AUT traffic 114 may be passed from the virtual device through the PAD 124 to the second network 112(2).

During use, the device management module 326, the session management module 324, or both may be monitoring to ensure that the performance of the PAD 124 is within specified parameters. In the event that the PAD status data 334 indicates a deviation that exceeds a value specified by the threshold data 340, one or more mitigation actions may take place. For example, the virtual device may be disassociated from the first PAD 124 and may be associated with the second PAD 124. During this transition from one PAD 124 to another PAD 124, the session between the test device 106 and the virtual device remains established. From the point of view of the test device 106, the transition may appear to be a temporary loss of network connectivity followed by a resumption of the network connectivity.

Further operation of the session management module 324 and the device management module 326 are discussed in more detail below with regard to the following figures.

In some implementations, the hardware, software, or other attributes of the virtual device may differ from that of the PAD 124 with which the virtual device is associated. For example, the virtual device may be presented during the session as if it is a tablet while the PAD 124 comprises a feature phone.

The examples described above involve the use of a virtual device. In some implementations, the virtual device may be omitted and the test device 106 may be connected to a particular PAD 124.

As described above, in some implementations the proxy host device 122 may generate log data 134. This log data 134 may be stored in the data store 320 or may be sent to other devices such as the test device 106, the management server 118, and so forth.

Other data 348 may also be stored in the data store 320. For example, the other data 348 may include accounting or billing data indicative of the amount of time that the test device 106 utilized the session, data charges associated with the session, and so forth.

Different computing devices may have different capabilities or capacities. For example, the workstation 108 may have significantly more processor 304 capability and memory 316 capacity compared to the processor 304 capability and memory 316 capacity of the TD 106.

Figure 4:
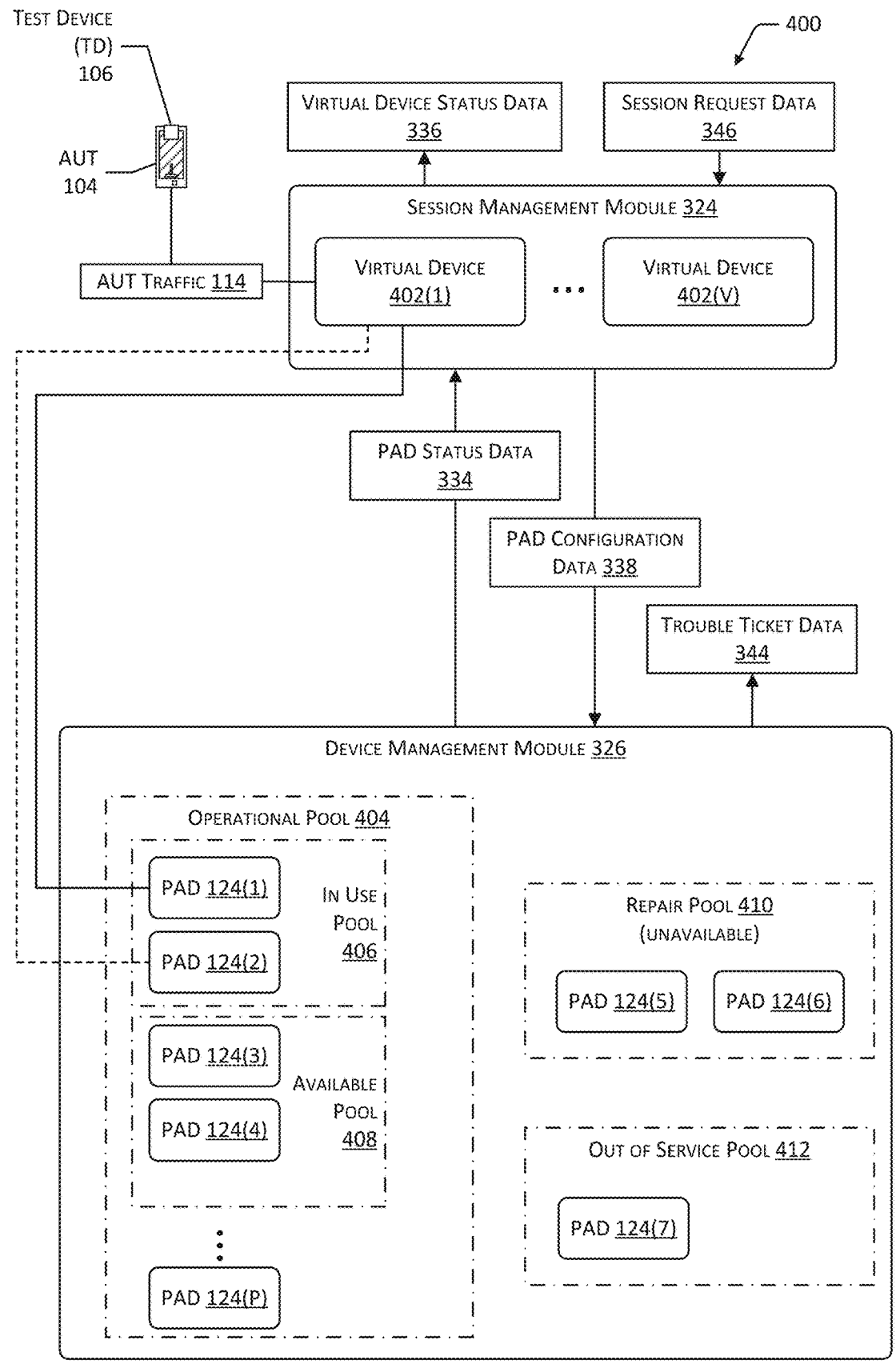
FIG. 4 is a block diagram illustrating the interaction of a session management module and a device management module that may be used by the PHD to manage an array of PADs, according to one implementation.

FIG. 4 is a block diagram 400 of the interaction of a session management module 324 and a device management module 326 that may be used by the proxy host device 122 to manage an array of PADs 124, according to one implementation.

The session management module 324 may receive the PAD status data 334 or data based at least in part thereon that indicates the operational status of the PADs 124 administered by the device management module 326 from the device management module 326. In some implementations, the session management module 324 may send PAD configuration data 338 to the device management module 326. For example, the session management module 324 may be instructed to provide virtual devices that utilize a particular telecommunication carrier and communication mode. PAD configuration data 338 to this effect may be sent to the device management module 326 that in turn provisions the PADs 124 accordingly.

The session management module 324 may instantiate one or more virtual devices 402. In some implementations, the instantiation may be on demand, such as upon request from a test device 106. In other implementations, the instantiation may be based on other input or conditions. For example, a certain number of virtual devices 402 may be instantiated at a predetermined time, such as before an anticipated period of high use by many developers 102. The virtual device 402 may be presented to the test device 106 as an actual piece of physical hardware having one or more specified attributes. The virtual device 402 may be deemed to be "located" at a particular geolocation 110 corresponding to the location of the PAD 124 with which it is associated, and using a particular telecommunication carrier for access to a WCDN or WLAN.

The session management module 324 may send virtual device status data 336 to one or more of the management server 118, test device 106, and so forth. For example, the virtual device status data 336 may indicate that five virtual devices 402 are available with various combinations of particular telecommunication carriers and communication modes. The developer 102 may select one virtual device 402 for use, and generate session request data 346 to this effect. In some implementations, the session request data 346 may include data indicative of one or more limits associated with the session. For example, those limits may specify a maximum amount of data transfer, a maximum cost, and so forth. The session may then be constrained according to those limits. For example, the session may terminate when the maximum amount of data transfer or maximum cost has been reached.

As described above, the virtual device 402 is associated with one or more PADs 124. In one implementation, this may be a one-to-one relationship with the virtual device 402 associated with a single PAD 124. In another implementation, the virtual device 402 may be associated with a plurality of PADs 124.

The PADs 124 may be allocated into different pools. Illustrated here is an operational pool 404 that includes an in use pool 406 and an available pool 408. The PADs 124 allocated to the in use pool 406 include those that are associated with a particular virtual device 402. The PADs 124 allocated to the available pool 408 include those that are available for use but have not yet been associated with a particular virtual device 402. In some implementations, the available pool 408 may include PADs 124 that are allocated as spares. The spares may not be presented for use by the virtual device 402, but may be used to replace a PAD 124 that failed during a session. Also shown is a repair pool 410 and an out of service pool 412. The device management module 326 may determine the allocation of the individual PAD 124 based at least in part on a comparison between the PAD status data 334 and the threshold data 340. In some implementations, the PAD status data 334 may be generated at least in part by an application executing on the PAD 124, an application executing on the proxy host device 122, or both. For example, the PAD status data 334 may comprise information indicative of an elapsed time since last data was received from the PAD 124. If this elapsed time exceeds a threshold value, the PAD 124 may be allocated to the repair pool 410.

While a session is in progress, the operational status of the PADs 124 in the in use pool 406 continues to be assessed. In the event one of the PADs 124 in the in use pool 406 is deemed to have failed, it may be reallocated, such as to the repair pool 410. The virtual device 402 that is utilizing the failed PAD 124 may be transitioned to use another PAD 124 from the operational pool 404. For example, this may include using an alternate PAD 124 that is in the in use pool 406 and was previously associated with that virtual device 402, or may include the use of one of the PADs 124 in the available pool 408.

The session management module 324 maintains an awareness of the PADs 124 associated with virtual devices 402. For example, the session management module 324 in the event of a failure of the PAD 124 would be prevented from reallocating the same failed PAD 124 to the session.

The device management module 326 may initiate one or more mitigation actions for the PADs 124 allocated to the repair pool 410. These mitigation actions may include performing one or more automated tasks in an attempt to restore the PAD 124 to an operational state for subsequent reallocation to the operational pool 404. In the event the mitigation actions fail, the PAD 124 may be allocated to the out of service pool 412 and trouble ticket data 344 may be generated. Troubleshooting of the PADs 124 in the out of service pool 412 may include the interaction of a more sophisticated automated system or a human operator responsive to the trouble ticket data 344. For example, a human operator may be instructed to remove and replace the non-operational PAD 124.

PADs 124 that are allocated to the operational pool 404 may be reallocated to the repair pool 410 for preventative maintenance. For example, a PAD 124 that is in an operational state may be transferred to the repair pool 410 once a day to undergo one or more mitigating actions such as a restart or reset. By implementing this preventative maintenance, overall reliability of the system may be improved and the timing of at least a portion of the mitigating actions may be shifted to off-peak hours.

In some implementations, the number of virtual devices 402 indicated in the pools may not equal the sum of the PADs 124 physically attached to the proxy host device 122. For example, a single PAD 124 may be configured to use a plurality of different telecommunication carriers and different communication modes. As a result of this reconfigurability, several virtual devices 402, each representing a different combination of telecommunication carrier and communication mode may be presented. Upon the selection of a particular virtual device 402, the PAD 124 may be configured accordingly and the other presentations of virtual devices 402 associated with that PAD 124 may be discontinued or transitioned to indicate that they are currently in use or no longer available.

In one implementation, during operation, the virtual device 402 has exclusive access to an associated PAD 124. In other implementations, one or more PADs 124 may be shared by a plurality of virtual devices 402.

Figure 5:
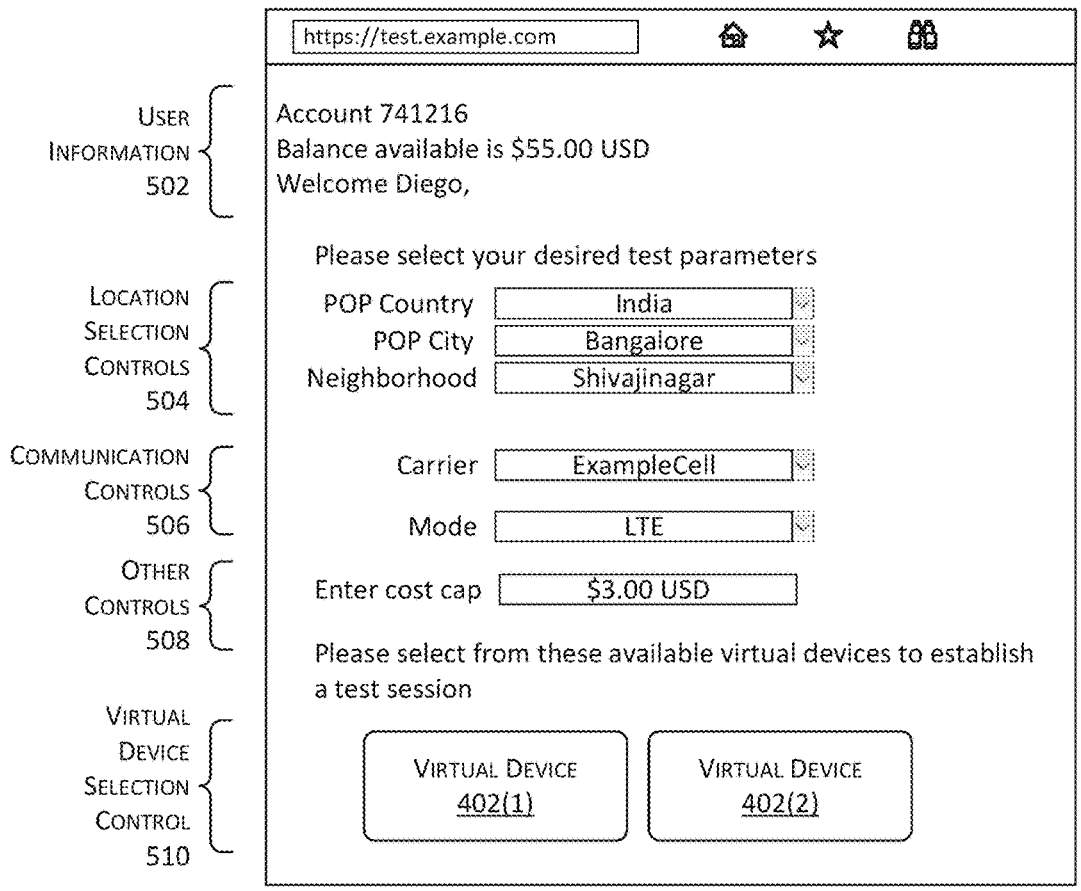
FIG. 5 depicts an example user interface from which a developer may select various parameters for testing, according to one implementation.

FIG. 5 depicts an example user interface 500 from which a developer 102 may select various parameters for testing, according to one implementation. In this illustration, the user interface 500 is presented within a web browser. In other implementations, the user interface 500 may be presented using another application. The user interface 500 may be presented on the test device 106, the workstation 108, or another device.

Depicted in the user interface 500 is user information 502 such as an account number, available balance, name of the user, and so forth. Location selection controls 504 allow the developer 102 to select various test parameters specifying the geolocation 110 of the POP facility 126 they wish to use. These location selection controls 504 permit the selection of one or more of the country, city, or neighborhood to be used for testing.

The communication controls 506 allow the developer 102 to specify communication parameters such as a particular telecommunications carrier, particular communication mode, and so forth. For example, the developer 102 may specify the use of a telecommunication carrier named ExampleCell with a communication mode of LTE. The communication modes may include, but are not limited to 2G, 3G, 4G, LTE, and so forth.

Other controls 508 may also be presented by the user interface 500. For example, the control depicted here allows the developer 102 to specify a cost cap associated with the session. For example, the session may continue until the cost of the session reaches the cost cap.

Virtual device selection controls 510 may also be presented within the user interface 500. As illustrated here, two buttons present the different virtual devices 402 that are available for use.

In some implementations, the instantiation configuration of the virtual devices 402 may be responsive to the input provided by the developer 102, such as obtained from this user interface 500. For example, after entry of data using the location selection controls 504 and the communication controls 506, the session management module 324 may instantiate the virtual devices 402 depicted here. In other implementations, the virtual devices 402 may be previously instantiated.

The various types of controls in the user interface 500 are depicted by way of illustration and not necessarily as a limitation. Other types of controls may be used. For example, instead of the combination of boxes depicted for the location selection controls 504, a map may be presented.

Figure 6:
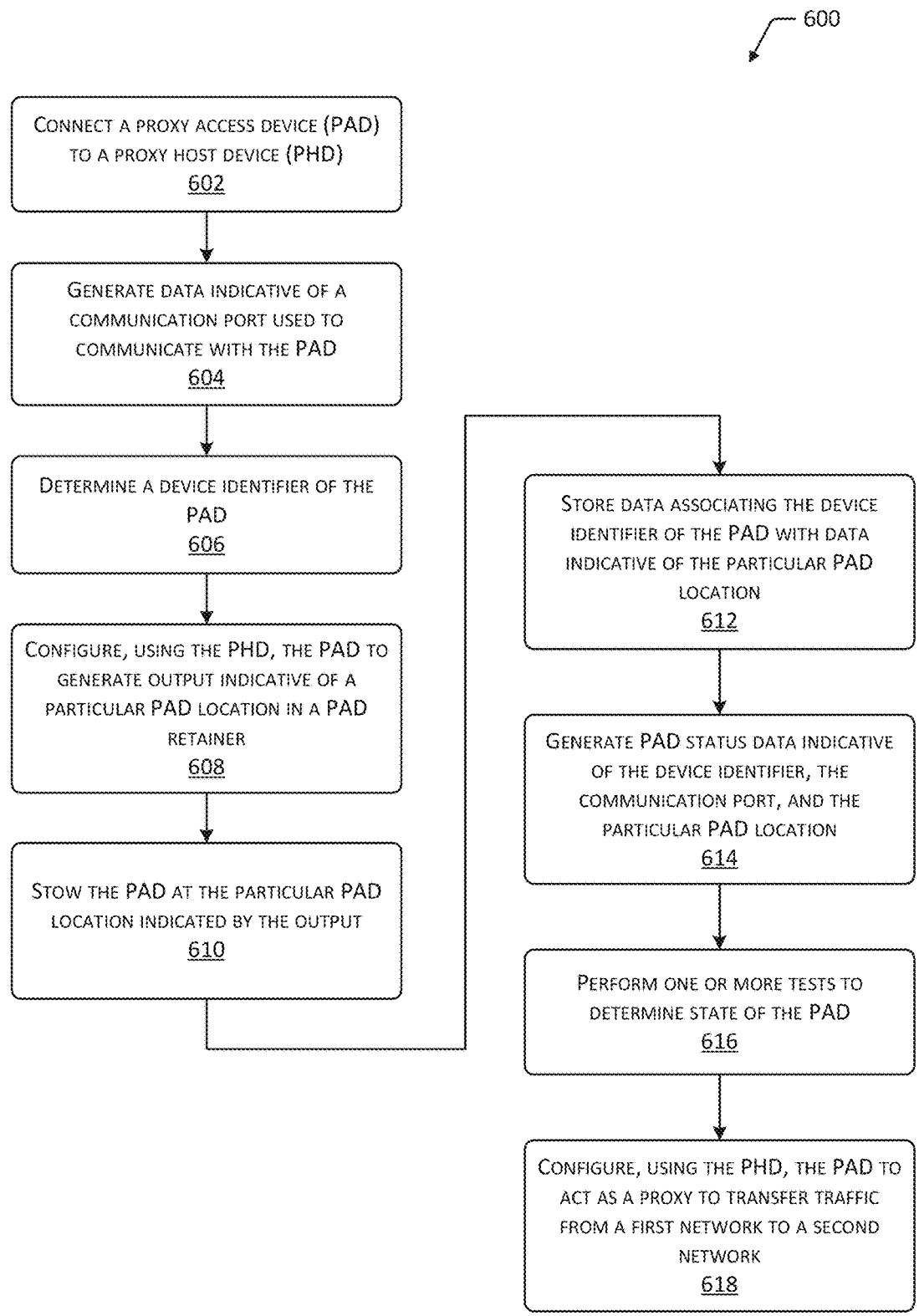
FIG. 6 is a flow diagram of a process for provisioning a PAD for use, according to one implementation.

FIG. 6 is a flow diagram of a process 600 for provisioning a PAD 124 for use, according to one implementation. The process 600 may be implemented at least in part by the proxy host device 122.

At 602, a connection is established between a PAD 124 and a proxy host device 122. For example, the PAD 124 may be connected via a USB tether to the proxy host device 122.

At 604, data indicative of a communication port used by the proxy host device 122 to communicate with the PAD 124 is generated. For example, data may indicate that USB port 27 is in use.

At 606, a device identifier of the PAD 124 is determined. The device identifier provides information that is indicative of a particular PAD 124. The device identifier may be considered unique within the context of a particular PAD retainer 128, particular POP facility 126, all POP facilities 126, and so forth. The device identifier may be indicative of one or more of a media access control (MAC) address associated with a communication interface, a device serial number assigned to the PAD 124 during manufacture, or a value manually input using an input device of the PAD 124. For example, the device identifier may be manually entered using a keyboard or touchscreen of the PAD 124 during set up.

At 608, the PAD 124 is configured using the proxy host device 122 to generate output indicative of a particular PAD location in a PAD retainer 128. The output may comprise one or more of human-readable symbols or machine-readable symbols presented on a display device of the PAD 124. For example, the proxy host device 122 may send commands to the PAD 124 to present on the display letters, numbers, or other symbology indicative of a particular PAD recess 208 within the PAD retainer 128.

At 610, the PAD 124 is stowed at the particular PAD location as indicated by the output. For example, the PAD 124 may be stowed in the PAD recess 208 having recess indicia 210 corresponding to that presented on the display device of the PAD 124.

At 612, data associating the device identifier of the PAD 124 with data indicative of the particular PAD location is stored. For example, this data may be stored in the data store 320.

At 614, PAD status data 334 is generated that is indicative of one or more of the device identifier, the communication port, or the particular PAD location.

At 616, one or more tests are performed to determine a state of the PAD 124. For example, one or more threshold values may be accessed in threshold data 340. The one or more tests may include sending particular instructions and expecting certain responses or actions responsive to those instructions. The state is indicative of the PAD 124 being operational or non-operational. Information about the state may be included in the PAD status data 334. As described above, information on the state of the PAD 124 may be used to determine the pool allocation of the PAD 124.

At 618, the proxy host device 122 is used to configure the PAD 124 to act as a proxy to transfer traffic between the proxy host device 122 and an external wireless network 112. For example, one or more applications may be installed on the PAD 124 to perform the proxy functions and exchange traffic between the first network 112(1) and the second network 112(2). In some implementations, operation of 618 may be responsive to a determination that the state of the PAD 124 is operational as described above with regard to 616.

In the event the PAD 124 is determined to have a state that is non-operational, automatic repair actions may be initiated. The repair actions may include one or more of: resetting the connection between the PAD 124 and the proxy host device 122, increasing a data transfer quota of an account associated of with the PAD 124, restarting the PAD 124, resetting the PAD 124, erasing contents of a memory of the PAD 124, installing an application on the PAD 124, executing an application on the PAD 124, or other actions. For example, the state may be non-operational because the telecommunication carrier account that is associated with the service provided to the PAD 124 may have an available data transfer quota that is less than the desired threshold value. The repair action may comprise making a payment to the telecommunication carrier for that account to buy additional data transfer privileges.

Figure 7:
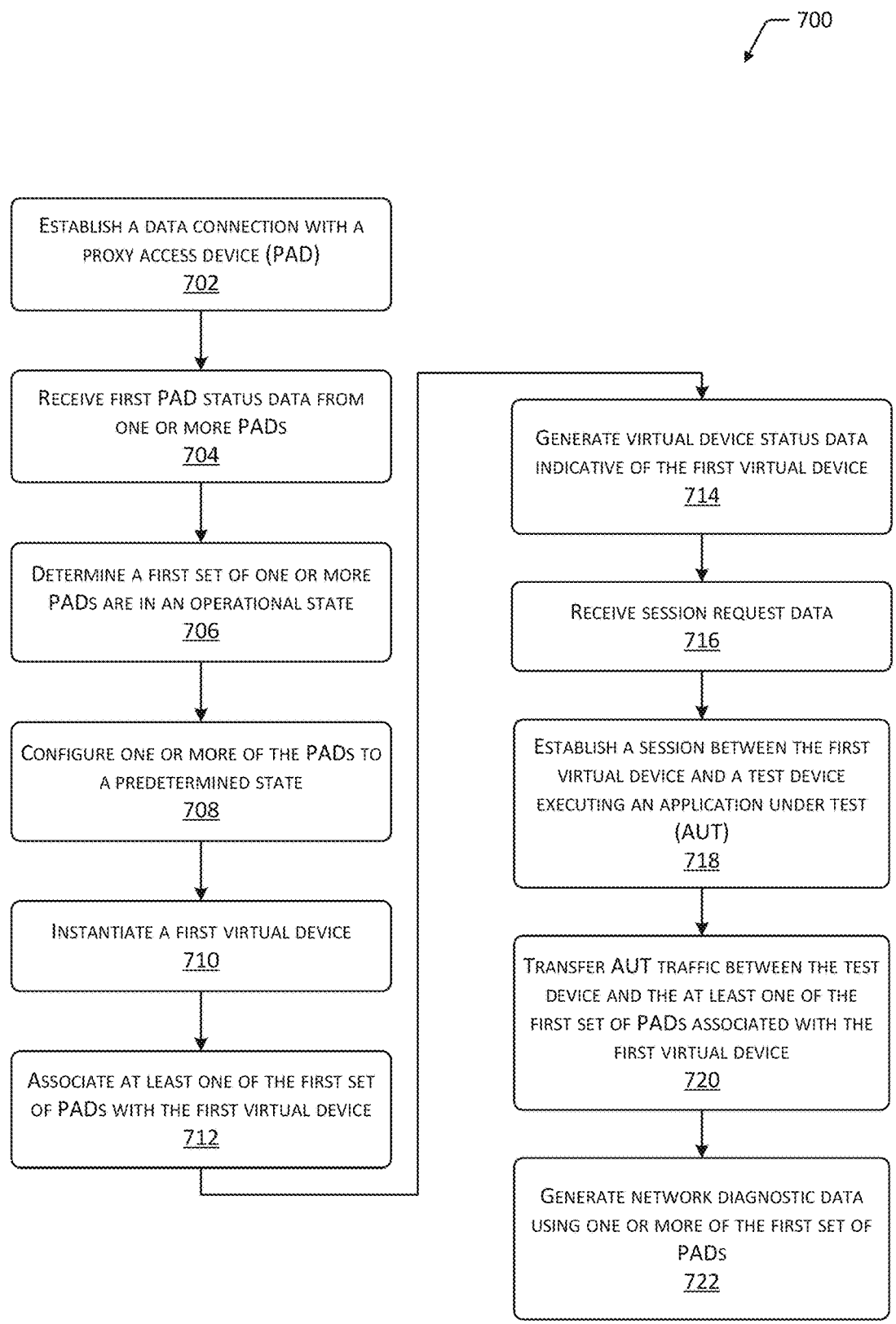
FIG. 7 is a flow diagram of a process for using a PAD to act as a proxy for a test device, according to one implementation.

FIG. 7 is a flow diagram of a process 700 for using a PAD 124 to act as a proxy for a test device 106, according to one implementation. The process 700 may be implemented at least in part by one or more of the proxy host device 122, the PAD 124, or other devices.

At 702, data connections are established with one or more PADs 124 using the communication interface. For example, a first data connection with a first PAD 124 is established using the communication interface such as a USB connection.

At 704, PAD status data 334 is received from one or more PADs 124 using the data connections. For example, first PAD status data 334 is received from the first PAD 124 using the first data connection. As described above, the PAD status data 334 may include information that is indicative of operation of the first PAD 124.

At 706, a first set of one or more of the PADs 124 is determined to be in an operational state. For example, the first PAD 124 may be determined to be operational at a first time based on a comparison between the PAD status data 334 and the threshold data 340.

The threshold data 340 may be accessed that is indicative of one or more of: elapsed time since last data received from the PAD 124, elapsed time since response by the PAD 124, data transfer quota remaining on a telecommunication carrier account associated with the PAD 124, cost of data transfer using the telecommunication carrier associated with the PAD 124, temperature of the PAD 124, and so forth. The PAD 124 may be determined as operational at the first time based on a comparison between the PAD status data 334 and the threshold data 340.

At 708, one or more of the PADs 124 are configured to a predetermined state. For example, the first PAD 124 may be configured to establish a data connection to a WCDN of the specified telecommunication carrier using a particular communication mode, or a particular WLAN.

At 710, one or more virtual devices 402 are instantiated. For example, a first virtual device 402 may be instantiated.

At 712, at least one of the first set of PADs 124 are associated with the first virtual device 402. For example, the first PAD 124 and a second PAD 124 may be associated with the first virtual device 402. The second PAD 124 may differ from the first PAD 124 in one or more of operating system, model, manufacture, or other aspect.

At 714, virtual device status data 336 is generated that is indicative of the first virtual device 402.

At 716, session request data 346 is received.

At 718, a session is established between the first virtual device 402 and a test device 106. For example, these devices may be suitably authenticated, exchange cryptographic credentials, and communication established between these devices. The test device 106 may be executing an AUT 104.

At 720, AUT traffic 114 is transferred between the test device 106 and the at least one of the first set of PADs 124 associated with the first virtual device 402.

At 722, network diagnostic data or other information associated with the WCDN or WLAN is generated using one or more of the first set of PADs 124. For example, the network diagnostic data may include packet loss information, jitter data, radio state, power levels, information indicative of buffer bloat, and so forth. In one implementation, instructions to determine network diagnostics may be executed once the developer 102 is through using the session, but before the session is discontinued. For example, as part of the session closeout process, the network diagnostic data may be acquired. In this implementation, the network diagnostic data is indicative of that connection experienced by the particular PAD 124 that was used for at least a portion of the testing, at the time the network diagnostic data was obtained.

In another implementation, network diagnostic data may be acquired from other PADs 124 in the operational pool 404 while testing takes place using the PADs 124 that are proxying data for the test device 104. For example, a first PAD 124(1) may be in use by the virtual device 402. While the first PAD 124(1) is transferring data between the test device 106 and the destination device 116, a second PAD 124(2) is being used contemporaneously to generate network diagnostic data. In this implementation, network diagnostic data may be obtained without impacting or skewing the test results being obtained by the first PAD 124(1).

The second PAD 124(2) may have characteristics in common with the first pad 124(1), including but not limited to one or more of telecommunication carrier, communication mode, geolocation 110, hardware, operating system version, and so forth. For example, the second PAD 124(2) used to generate the network diagnostic data may be located at the same geolocation 110 as the first PAD 124(1), using the same WCDN or Wi-Fi network, and using the same connection mode such as 3G or Wi-Fi 802.11ac. The first PAD 124(1) and the second PAD 124(2) may be the same make, model, manufacturer, and so forth in some implementations, while in other implementations they may be different.

In some implementations network diagnostic data may be obtained using one or more of operation in parallel with testing, as described above using the first PAD 124(1) and the second PAD 124(2), at the conclusion of a session, or interspersed with testing. For example, the network diagnostic data may be obtained in parallel using the second PAD 124(2) and also at the conclusion of the session that uses the first PAD 124(1). In another example, testing may be momentarily paused to generate the network diagnostic data, and then resumed.

Other actions may also be taken. For example, the developer 102 or an account associated therewith may be billed or debited for the cost of the session.

Figure 8:
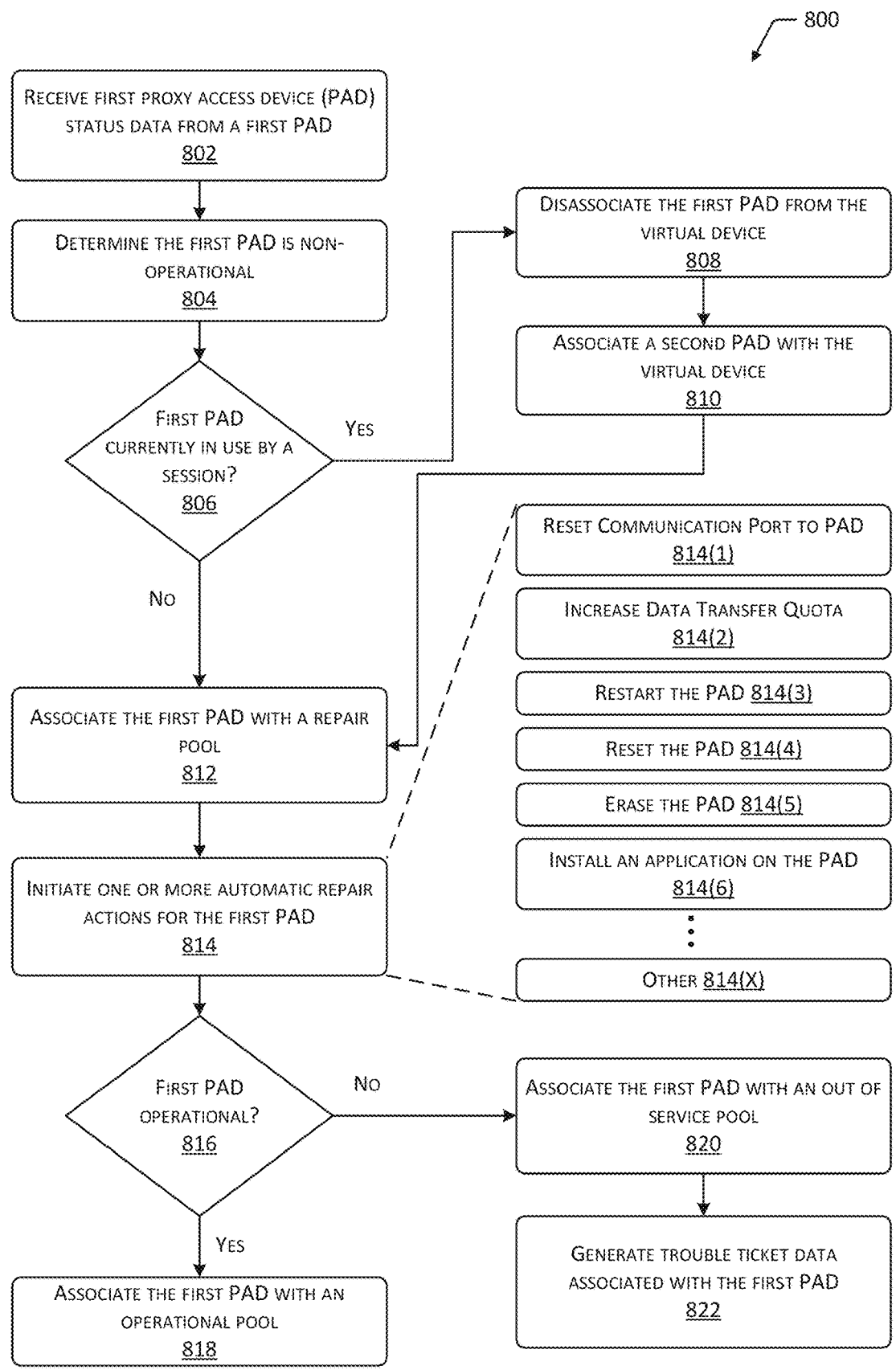
FIG. 8 is a flow diagram of a process of automatic repair of a PAD in the array, according to one implementation.

FIG. 8 is a flow diagram of process 800 of automatic repair of a PAD 124 in an array of PADs 124, according to one implementation. The process 800 may be implemented at least in part by one or more of the proxy host device 122, the PAD 124, or other devices. The following process 800 may operate before, during, or after a session.

At 802, first PAD status data 334 is received from a first PAD 124.

At 804, the first PAD 124 is determined to be non-operational. For example, as described above, the PAD status data 334 may be compared with one or more values specified by the threshold data 340 to determine the operational state.

In some implementations, the process 800 may be used for preventative maintenance. For example, the PAD 124 may be otherwise operating within specification except for a value of PAD status data 334 that is indicative of an elapsed time since one or more of: last restart, last reset, initial setup, start time, and so forth, that exceeds a maximum specified threshold value. Continuing the example, preventative maintenance may include restarting the PAD 124 once every 24 hours.

At 806, a determination is made as to whether the first PAD 124 is currently in use by a session. If yes, the process 800 may proceed to 808. At 808, the first PAD 124 is disassociated from the virtual device 402. At 810, a second PAD 124 is associated with the virtual device 402. Thus, the virtual device 402 is transitioned from the first PAD 124 to the second PAD 124. During this process, if a session is in progress that involves the first PAD 124, that session remains in effect. Following the transition, the session carries on using the second PAD 124 to access the second network 112(2). The process 800 may then proceed to 812 as described below.

Returning to 806, if the determination is no, the process 800 may proceed 812. At 812, the first PAD 124 is associated with the repair pool 410. For example, the pool data 342 maintained by the proxy host device 122 may be updated to reflect that the first PAD 124 is in the repair pool 410.

At 814, one or more automatic repair actions for the first PAD 124 are initiated. In some implementations, several of these actions may be performed in a predefined sequence, or according to previously defined decision logic.

The repair actions may include one or more of: resetting 814(1) the connection or communication port between the PAD 124 and the proxy host device 122, increasing a data transfer quota 814(2) of an account associated of with the PAD 124, restarting the PAD 814(3), resetting the PAD 814(4), erasing 814(5) contents of a memory of the PAD 124, installing an application on the PAD 814(6), executing an application on the PAD 124, or other actions 814(X).

At 816, a determination is made as to whether the first PAD 124 is operational. For example, one or more tests may be performed or PAD status data 334 may otherwise be obtained and compared to the threshold data 340 to determine the operational state.

If the determination at 816 is that the first PAD 124 is now operational, the process 800 proceeds to block 818. At 818, the first PAD 124 is associated with the operational pool 404.

If the determination at 816 is that the first PAD 124 is non-operational, the process 800 proceeds to block 820. At 820, the first PAD 124 is associated with an out of service pool 412. At 822, trouble ticket data 344 associated with the first PAD 124 is generated. The trouble ticket data 344 may be sent to the management server 118 or another device. The trouble ticket data 344 may include data indicative of the device identifier and a physical storage location associated with that device identifier. For example, the trouble ticket data 344 may indicate a particular PAD recess 208 within a particular PAD retainer 128.

Figure 9:
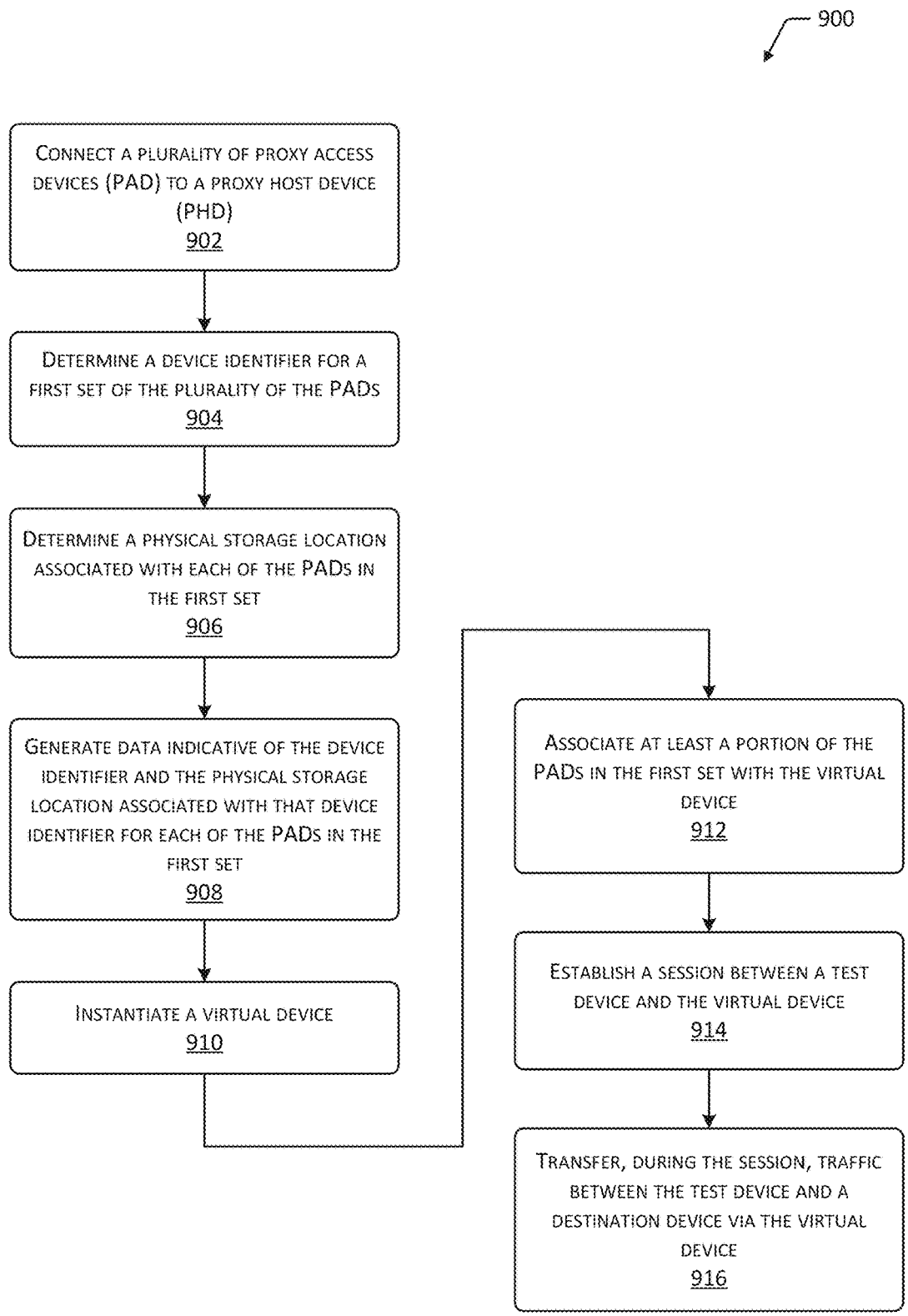
FIG. 9 is a flow diagram of another process for using a PAD to act as a proxy for a test device, according to one implementation.

FIG. 9 is a flow diagram of another process 900 for using a PAD 124 to act as a proxy for a test device 106, according to one implementation. The process 900 may be implemented at least in part by one or more of the proxy host device 122, the PAD 124, or other devices.

At 902, a plurality of PADs 124 are connected to a proxy host device 122.

At 904, a device identifier for a first set of the plurality of PADs 124 is determined.

At 906, a physical storage location associated with each of the PADs 124 in the first set is determined. For example, inventory information may be retrieved from the data store 320 that was obtained during initial provisioning in which a human operator placed the PADs 124 within particular PAD recesses 208.

At 908, data indicative of the device identifier and the physical storage location associated with that device identifier for each of the PADs 124 in the first set is generated.

At 910, a virtual device 402 is instantiated. For example, the instantiation may occur as described above.

At 912, at least a portion of the PADs 124 in the first set are associated with the virtual device 402.

At 914, a session is established between a test device 106 and the virtual device 402. As described above, in some implementations, virtual device status data 336 indicative of the availability of the virtual device 402, attributes of the virtual device 402, and so forth, may be sent. Session request data 346 may be received that includes data indicative of the virtual device 402. The establishment of the session may be responsive to the session request.

At 916, traffic is transferred during the session between the test device 106 and a destination device 116 via the virtual device 402 that is using a wireless carrier data network connection of one or more PADs 124 in the at least a portion of the PADs 124 in the first set.

By using the devices, techniques, and processes described in this disclosure the developer 102 may be able to quickly and efficiently test the operation of an application under a wide variety of real-world conditions at different geolocations 110. Using the results from these tests, the overall quality of the AUT 104 may be improved more quickly and cost-effectively.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a communication interface;
    one or more memories storing computer-executable instructions; and
    one or more hardware processors to execute the computer-executable instructions to:
        establish a first data connection with a first proxy access device (PAD) using the communication interface;
        receive, using the first data connection, first PAD status data indicative of operation of the first PAD;
        determine the first PAD is operational at a first time;
        configure the first PAD to a predetermined state;
        instantiate, by a first proxy host device, a first virtual device including one or more attributes indicative of a type of computing device;
        associate, by the first proxy host device, at least the first PAD with the first virtual device;
        generate virtual device status data indicative of the first virtual device;
        receive session request data;
        establish a session between the first virtual device and a test device executing an application under test (AUT); and
        transfer AUT traffic from the test device through the first virtual device to the first PAD associated with the first virtual device.

2. The system of claim 1, the one or more hardware processors further to execute the computer-executable instructions to:
    establish a second data connection with a second PAD using the communication interface, wherein the second PAD differs from the first PAD in one or more of operating system, model, or manufacturer;
    receive, using the second data connection, second PAD status data indicative of operation of the second PAD;
    determine the second PAD is operational at a second time;
    configure the second PAD to a predetermined state; and
    associate the second PAD with the first virtual device.

3. The system of claim 1, wherein the predetermined state of the first PAD indicates the first PAD is connected to a wireless cellular data network of a specified telecommunication carrier using a specified connection mode.

4. The system of claim 1, the one or more hardware processors further execute the computer-executable instructions to:
    access threshold data indicative of one or more of:
        elapsed time since last data received from the first PAD,
        elapsed time since a response by the first PAD,
        data transfer quota remaining on a telecommunication carrier account associated with the first PAD,
        cost of data transfer using the telecommunication carrier account associated with the first PAD, or
        temperature of the first PAD; and
    determine the first PAD is operational at the first time based on a comparison between the first PAD status data and the threshold data.

5. The system of claim 1, the one or more hardware processors further execute the computer-executable instructions to:
    establish a second data connection with a second PAD using the communication interface;
    receive second PAD status data indicative of operation of the second PAD using the second data connection;
    determine the first PAD associated with the first virtual device is no longer operational;
    while maintaining the session between the first virtual device and the test device:
        disassociate the first PAD from the first virtual device; and
        associate the second PAD with the first virtual device; and
    transfer the AUT traffic between the test device and the second PAD associated with the first virtual device.

6. The system of claim 5, the one or more hardware processors further execute the computer-executable instructions to:
    initiate an automatic repair action that comprises one or more of:

reset of the first data connection,
increase a data transfer quota of an account associated with the first PAD,
restart the first PAD,
reset the first PAD,
erase contents of a memory of the first PAD,
install an application on the first PAD, or
execute an application on the first PAD.

7. The system of claim 6, the one or more hardware processors further execute the computer-executable instructions to:
determine the first PAD is non-operational;
designate the first PAD as out of service; and
generate a trouble ticket indicative of the first PAD.

8. A method comprising:
connecting a plurality of proxy access devices (PADs) to a proxy host device;
determining a device identifier for a first set of the plurality of PADs;
determining a physical storage location associated with each of the plurality of PADs in the first set;
generating data indicative of the device identifier and the physical storage location associated with the device identifier for each of the plurality of PADs in the first set;
instantiating, by the proxy host device, a virtual device;
associating, by the proxy host device, at least a portion of the plurality of PADs in the first set with the virtual device;
establishing a session between a test device and the virtual device; and
transferring, during the session with the virtual device, traffic between the test device and a destination device using a wireless carrier data network connection of one or more PADs in the at least a portion of the plurality of PADs in the first set associated with the virtual device.

9. The method of claim 8, further comprising:
sending virtual device status data indicative of availability of the virtual device;
receiving a session request including data indicative of the virtual device; and
wherein the establishing the session is responsive to the session request.

10. The method of claim 8, wherein the virtual device is presented to the test device as an actual piece of physical hardware having one or more specified attributes and that the virtual device is located at a particular geolocation and using a particular telecommunication carrier for access to a wireless cellular data network.

11. The method of claim 8, further comprising:
configuring one or more of the at least a portion of the plurality of PADs in the first set to use a wireless cellular data network of a specified telecommunication carrier using a specified connection mode.

12. The method of claim 8, further comprising:
determining, at a first time, a value of data indicative of operation of one or more PADs of the plurality of PADs exceeds a threshold value; and
initiating an automatic repair action comprising one or more of:
resetting a connection between the one or more PADs and the proxy host device,
increasing a data transfer quota of an account associated with the one or more PADs,
restarting the one or more PADs,
resetting the one or more PADs,
erasing contents of a memory of the one or more PADs,
installing an application on the one or more PADs, or
executing an application on the one or more PADs.

13. The method of claim 12, wherein the value of the data is indicative of an elapsed time since one or more of: last restart, last reset, initial setup, and start time and the threshold value specifies a maximum time.

14. The method of claim 12, further comprising:
determining, at a second time, a value of data indicative of operation of the one or more of the plurality of PADs exceeds the threshold value;
designating the one or more of the plurality of PADs as out of service; and
generating trouble ticket data, wherein the trouble ticket data includes the data indicative of the device identifier and the physical storage location associated with the device identifier.

15. A method comprising:
establishing a connection between a proxy access device (PAD) and a proxy host device;
generating data indicative of a communication port used by the proxy host device to communicate with the PAD;
determining a device identifier of the PAD;
configuring, using the proxy host device, the PAD to generate output indicative of a particular PAD location in a PAD retainer that physically supports the PAD;
stowing the PAD at the particular PAD location as indicated by the output;
storing data associating the device identifier with data indicative of the particular PAD location; and
generating PAD status data indicative of the device identifier, the communication port, and the particular PAD location.

16. The method of claim 15, the determining the device identifier comprising:
receiving data indicative of the device identifier from the PAD, wherein the device identifier is indicative of one or more of a media access control address associated with a communication interface, a device serial number assigned to the PAD during manufacture, or a value manually input using an input device of the PAD.

17. The method of claim 15, wherein the output comprises one or more of human-readable symbols or machine-readable symbols presented on a display device of the PAD.

18. The method of claim 15, further comprising:
accessing one or more threshold values;
performing one or more tests to determine a state of the PAD, wherein the state is indicative of the PAD being operational or non-operational; and
wherein the PAD status data is indicative of the determined state.

19. The method of claim 18, further comprising:
determining the state of the PAD is operational; and
configuring, using the proxy host device, the PAD to act as a proxy to transfer traffic between the proxy host device and an external wireless network.

20. The method of claim 18, further comprising:
determining the state of the PAD is non-operational; and
initiating automatic repair actions comprising one or more of:
resetting the connection between the PAD and the proxy host device,
increasing a data transfer quota of an account associated with the PAD,
restarting the PAD,
resetting the PAD,
erasing contents of a memory of the PAD, installing an application on the PAD, or executing an application on the PAD.

\* \* \* \* \*